Sept. 17, 1940. J. J. BROWN 2,214,760
RESISTANCE WELDING ELECTRODE
Filed Feb. 28, 1938 3 Sheets-Sheet 2
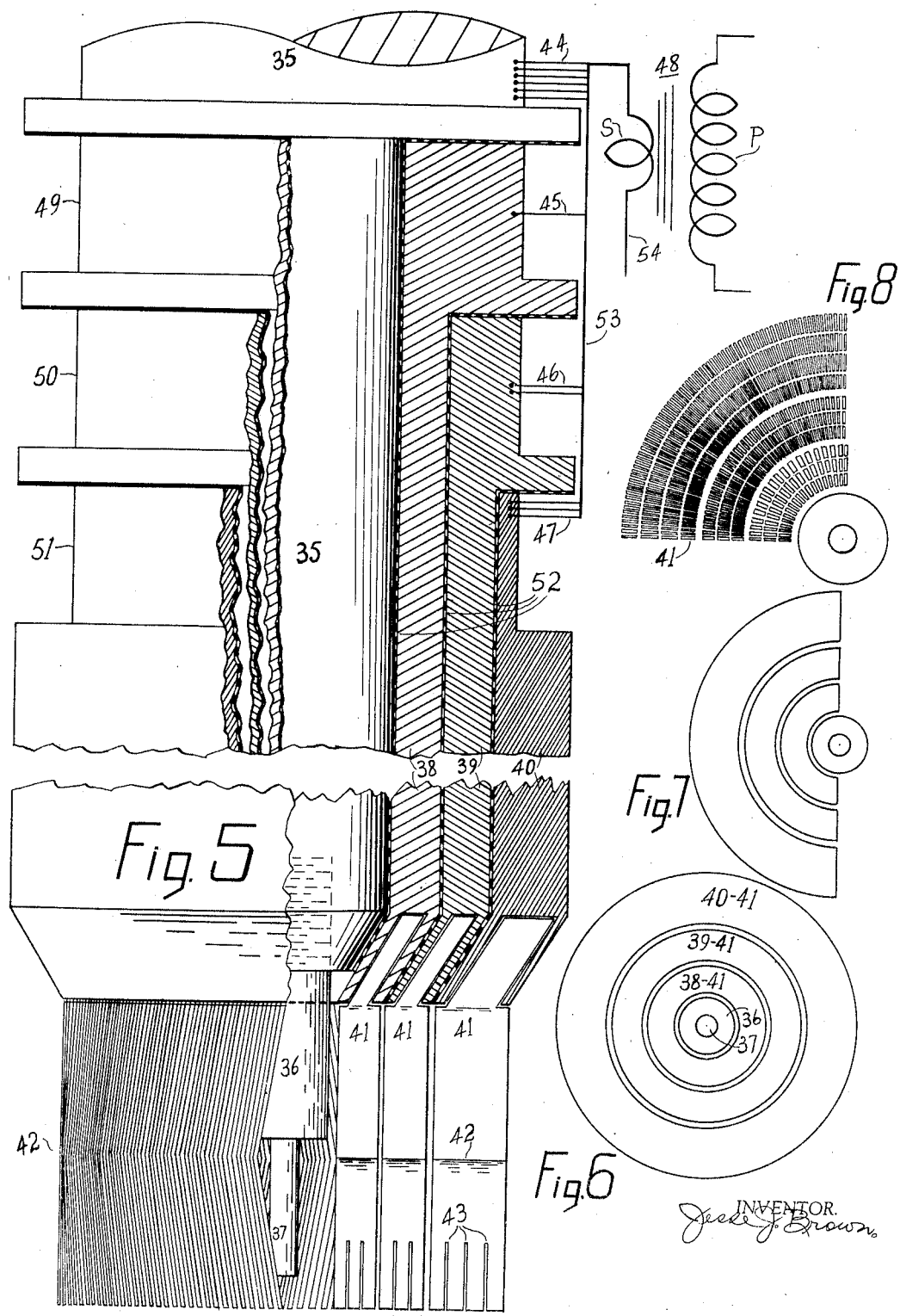

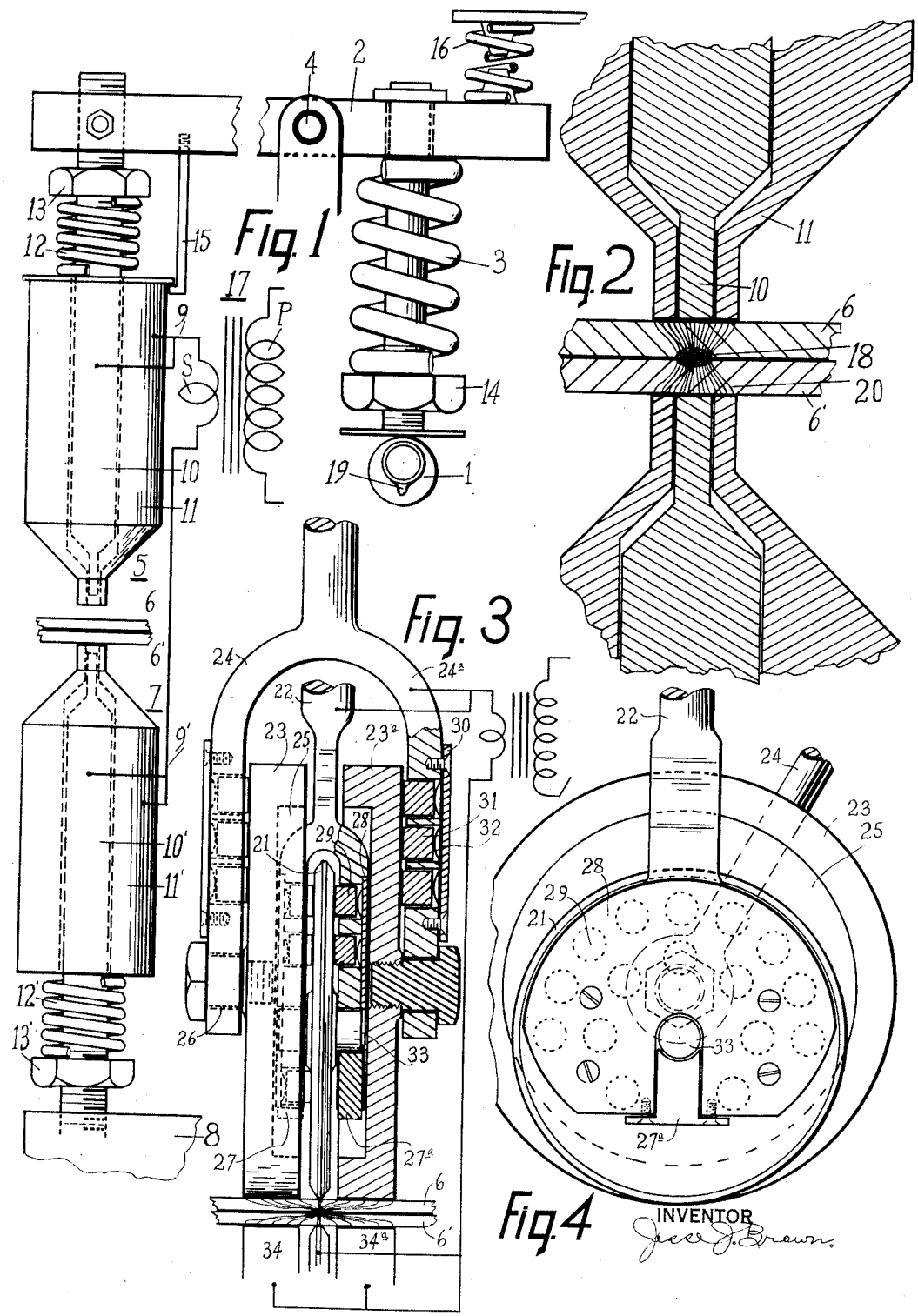

Sept. 17, 1940.  J. J. BROWN  2,214,760
RESISTANCE WELDING ELECTRODE
Filed Feb. 28, 1938  3 Sheets-Sheet 3
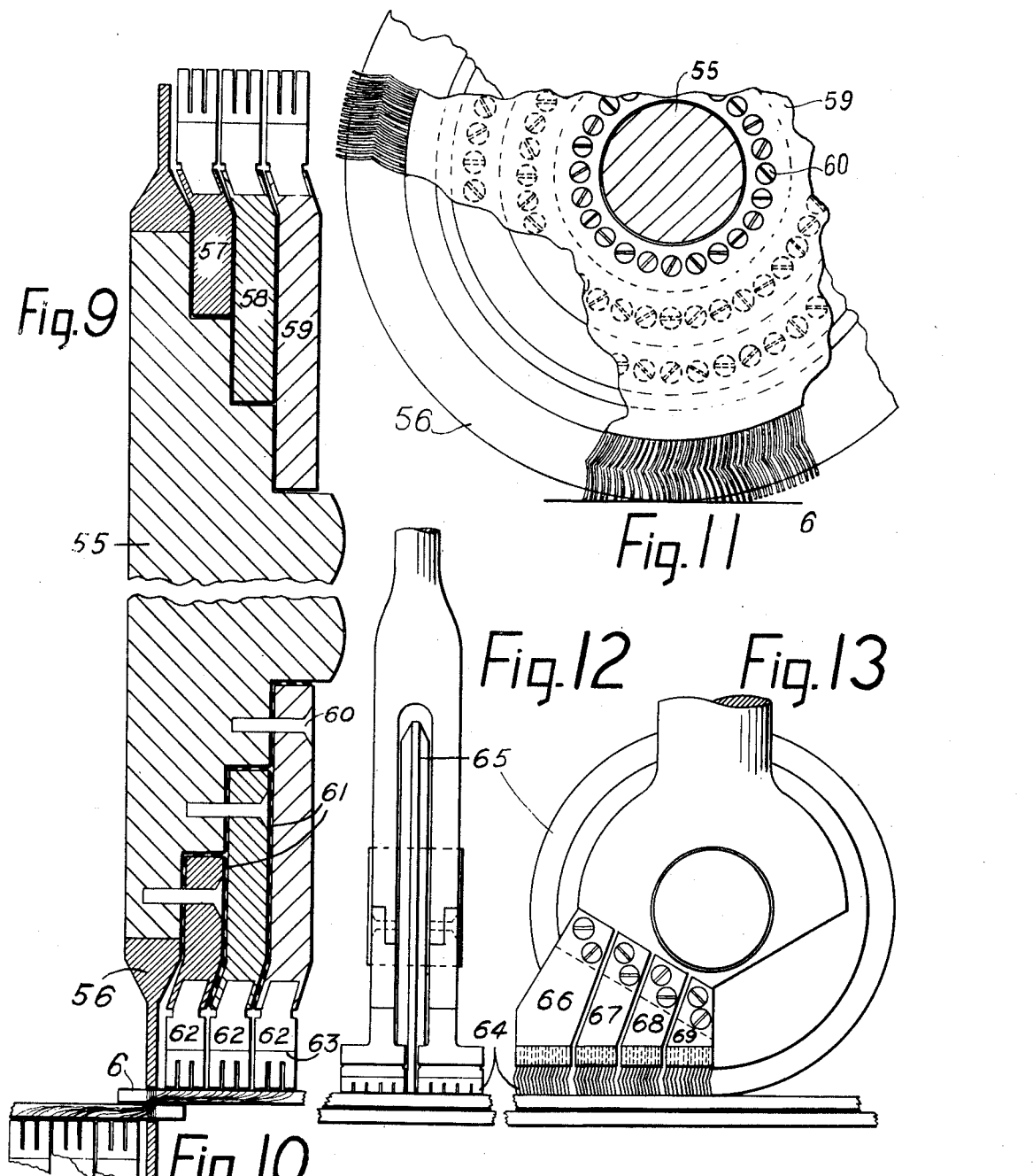
INVENTOR.
Jesse J. Brown Patented Sept. 17, 1940

2,214,760

UNITED STATES PATENT OFFICE 2,214,760

RESISTANCE WELDING ELECTRODE

Jesse J. Brown, Syracuse, N. Y.

Application February 28, 1938, Serial No. 193,200

8 Claims. (Cl. 219—4)

This invention relates to an improvement in apparatus for resistance welding, particularly an electrode for spot or seam welding materials having high electrical and thermal conductivities, such as copper, aluminum, etc. Still more specifically, it relates to a resistance welding electrode constructed of two main parts, one part being made of a high-strength material to impart the necessary forging pressure to a very restricted area only of the work surface and to transmit to the work a substantial portion of the welding current; the other part being made of a material having high electrical conductivity, designed to contact a larger portion of the work surface immediately adjacent the forging part, exerting on the work a relatively light pressure, preferably with a yieldable face, and transmitting to the work surface the balance of the necessary welding current.

In my co-pending application, Serial No. 91,151, since matured into Patent No. 2,109,461 of March 1, 1938, the method of eliminating destructive heating at the junction between the electrode tip and the outer surface of the work is described. The present application is a continuation in part of that co-pending application.

In resistance welding, the welding heat is generated by passing a very heavy electric current thru the pieces to be welded together, the greatest heat being generated at the point in the circuit which has the highest resistance, which is usually at the junction between the surfaces of the parts being welded and at that point in those surfaces where mechanical pressure is applied to press them firmly together. The heavy current necessary is usually furnished by a step-down transformer.

The electrodes carrying current to the work must of a necessity be of a material having a high electrical conductivity, and are usually of hard copper of copper alloy. Such material is relatively soft and tends to mushroom under production conditions, due to the combination of heat and mechanical pressure.

In welding steel, the resistance of the joint between the pieces of steel is much greater than that of the joint between the copper electrode and the steel and the heating effect is therefore satisfactorily localized at the former place. However, when welding such low-resistance materials as copper or aluminum, the resistance of the joint between the pieces of material is much lower than in the case of steel, almost as low as the joint between the copper electrode and the material, and the problem of localizing the heat between the pieces of work becomes difficult.

With such materials as aluminum, much heavier currents must be used than to weld like pieces of steel because of the higher conductivities mentioned, and other factors call for welding aluminum very quickly. Reducing the time of the weld requires a further increase in current values, so that extremely large currents are necessary to satisfactorily spot-weld aluminum. This being the case, the current density at the tip of the electrode where it contacts the work becomes very great, especially as the electrode is of reduced cross-section at this point to concentrate the pressure and heating effect in a relatively small area of the inner faces of the work.

As there is no known way to ascertain the quality of a spot weld without destroying it, it is highly important that the various factors upon which this quality depends be maintained unchanged after a satisfactory adjustment of all those factors have been arrived at, and one factor which in the past has been difficult if not impossible to maintain is the size and shape of the electrode tip, a slight change in this throwing most all the other factors out of adjustment. The best tips known to the art today tend to heat and lose their hardness, and as a result, mushroom.

One object of this invention is to provide a forging electrode which will maintain its size and shape under prolonged use and thus permit of more consistent quality welding.

Another object of this invention is to provide an electrode which will give a low electrical resistance contact between the electrode and the outer surface of the work, and which at the same time highly restricts the area subjected to forging pressure so as to concentrate the heat in the weld area proper.

Another object is to permit making spot-welds as small as desired, limited only by the ability of the work material to withstand the forging pressure when applied to such small area.

Another object is to provide an electrode which will distribute the current over a relatively large area of the outer surface of the work while concentrating the forging pressure and the current in a relatively small area of the inner faces of the work where the weld is to be made.

Another object is to provide an electrode which will make repeated welds without overheating and softening the electrode tip or the outer surface of the work.

In this invention, the die or forging electrode is made of a material having the required mechanical strength and hardness, and is arranged to carry to the work such portion only of the welding current as it will handle without undue heating at its contact with the work, the balance of the current necessary to make the weld is carried to the work immediately adjacent the die by an auxiliary electrode of high-conductivity material and which is arranged to press against the work with substantially less mechanical pressure than does the die. This lighter pressure is necessary to prevent giving too firm a contact between the inner faces of the work opposite the auxiliary electrode, which would spread the current-contact area thereat and reduce the current and heat concentration at the point where it is desired to make the weld.

If the auxiliary electrode is made with a solid face, its area of contact with the work must be very limited, it being obviously impossible to obtain even contact thruout a large area at low pressure, and the current density would then be poorly distributed. Two other forms of faces for the auxiliary electrode are illustrated herewith showing a multipoint yielding contact covering sufficient area to reduce the electrical resistance of the contact so that undue heating will not result.

In the drawings,

Fig. 1 shows in elevation, the pertinent parts of a conventional spot-welder, with upper and lower electrodes embodying the principle of the invention—a small forging core and a larger auxiliary current-carrying shell, in this case the shell slidable on the core, the electrodes being in normal or non-operating position.

Fig. 2 shows a cross-section of the same electrodes when in the operating position and illustrates the approximate distribution of the current thru the work.

Fig. 3 shows an end elevation of one form of seam-welder electrode, partly cut away, embodying the invention.

Fig. 4 is a side elevation of the electrode of Fig. 3, partly cut away.

Fig. 5 shows a detailed elevation, partly cut away, of a preferred form of spot welding electrode, the shell being in three concentric parts, each such part arranged and electrically connected so as to provide approximately even current density over the area of the work that its face contacts, such face presenting finely divided and yielding contact with the work. In this case the shell is rigidly fixed to the core.

Fig. 6 illustrates graphically the relative areas of the parts of the face of the electrode of Fig. 5.

Fig. 7 illustrates how the electrode of Fig. 5 may be modified so as to weld close to an angle or projection.

Fig. 8 illustrates how the same electrode may be modified so as to weld close to a corner.

Figs. 9 and 10 show a cross-section elevation of another form of seam-welder electrode.

Fig. 11 shows part of a side elevation of the electrode of Fig. 10.

Fig. 12 is an end elevation of still another seam-welder electrode using sliding shoes in place of auxiliary current-wheels.

Fig. 13 is a side elevation of the electrode of Fig. 12.

Smaller spots, in general, mean higher quality. If spot-welding is attempted with very large electrodes, the pressure required is tremendous and the large face of the electrode does not contact the surface of the work evenly and the current "bunches" and burns in some places. Usually, an electrode tip larger than is otherwise needed, is used in welding aluminum in the endeavor to avoid the terrifically high current-density at the tip, with its detrimental heating. This present invention will permit the smallest tips to be used because the current-density is reduced at the tip. With a smaller tip, less total current is needed, with obvious advantages.

Fig. 2 shows that a goodly portion of the welding current may be made to pass thru shell 11 and enter the work at a relatively low density just outside of the spot proper which is located by the core 10. The current then travels thru the work and converges at the junction of the pieces where it is sufficiently dense to form the weld. The current converges at this point due to the lower resistance of this junction at the point therein where the cores 10 and 10' are pressing the pieces firmly together, as compared with the resistance opposite the shell contacts, as the pressure on the shells is much lighter than that on the cores. The theoretical path of the current is indicated in Fig. 2 by the lines 20.

It is obvious that the relative areas of the core and shell of Fig. 1 may be varied to suit the particular work being handled, and the relative amounts of current handled by each will be dependent upon this factor, the relative resistances of the materials of which each is composed, their cross-section, etc., or, in other words, upon the relative total resistances of the paths thru each part including the contact with the work. The object being to first construct a core strong enough and hard enough to handle the forging stresses and to carry as much of the necessary welding current as it can readily handle without undue heating at the tip's contact with the work, which heating, if excessive, tends to soften the tip and permits mushrooming. It is obvious also, that any desired division of the current between core and shell may be obtained.

This invention permits using an alloy harder, if necessary, than any used previously, as the lower conductivity of such harder alloy is herein compensated for by carrying a substantial part of the total current around the core's contact with the work, thru the shell. The preferred material for the core will, in any case be one which is just hard enough to withstand the forging forces without distortion and with as high an electrical conductivity as it is possible to obtain with this hardness so as to carry as much of the welding current as possible without undue heating at the tip contact. The shell then will need to have as high a conductivity as is feasible and contact a sufficient area of the outer work surface as is necessary to conduct the balance of the total welding current to the work also without undue heating, taking into account the light pressure necessarily used on the shell.

*Operation.*—Figure 1 will serve to illustrate the operation, tho it should be understood that only one electrode of this type may be used in some cases as, where the work is backed up by a solid block electrode. The operator initiates the welding cycle in any of the usual ways to start cam 1 in operation, it being presumed that the connected mechanism is of the one-operation type and must be started each time the operator wishes to make a weld. This acts thru spring 3 and pivot 4 to lower electrode assembly 5 to the work 6. Shell 11 touches the work first, then springs 12 and 12' are compressed, core 10 touches the work, spring 3 is compressed, and, while cam 1 is on its highest point and maximum pressure is being applied to core 10 and shell 11, a lug 19 on cam 1 trips the electric switch mechanism, not shown, to turn on and off the welding current, and the weld is complete. Further turning of cam 1 releases the pressure on spring 3, allows spring 16 to raise core 10, release springs 12 and 12' and, thru hook member 15, raise shell 11 from the work.

In Fig. 3, forging pressure is put on forging roller 21 thru arm 22, current being assisted around the bearing thru brushes 29, held in place by plate 28. Forks 24 and 24a of an auxiliary arm support current-carrying rollers 23 and 23a immediately adjacent forging roller 21. These current-carrying rollers are recessed as at 25 to give clearance for the forks of arm 22. Brushes 31 assist here also in the transfer of current. The total area of the contact of rollers 23 and 23a with the work surface is much greater than that of forging roller 21. The pressure exerted upon the work by current-rollers 23 and 23a is made much less than that of forging roller 21 so that the work pieces will not be firmly pressed together opposite the current-rollers and thus provide a path for current to cross from work to work at a point other than opposite the forging electrodes.

One varition of this is to slightly stagger the current-rollers 23 and 23a relative to the corresponding current-rollers 34 and 34a on the opposite side of the work so as to reduce the tendency to press the work pieces together between the opposing current-rollers, that is, roller 23 may be positioned slightly ahead of or behind opposing roller 34, and a similar relation maintained between rollers 23a and 34a. The total resistance of the path thru arm 22 and forging roller 21 and into the work is regulated, preferably by properly selecting the material comprising forging roller 21 or by using a relatively high-resistance and hard alloy tire on such roller as is shown at 56 in Fig. 10, so that the current carried by the path is limited to an amount which will not cause excessive heating at the contact of the roller with the work surface; also, the path thru arms 24 and 24a and current-rollers 23 and 23a and into the work is similarly adjusted to readily handle the balance of the welding current without undue heating at the contacts of the current-rollers with the work surface, preferably by regulating the pressure of rollers 23 and 23a on the work and the width of same contacting the work. These rollers will of course be of high-conductivity material. The forging roller 21 and the current-rollers 23 and 23a of Fig. 3 correspond to core 10 and shell 11 respectively of Fig. 1 and are independently connected to the transformer as shown to facilitate the desired current distribution.

The current rollers may also be positioned to contact the work slightly ahead of the forging roller so as to reduce the tendency of that current introduced into the work by the current rollers to by-pass back thru the last previously welded spot. Thus the total current required is reduced.

The spot-welding electrode shown in Fig. 5 is constructed of a core 35 made of strong and relatively high electrical conductivity material, a forging tip 36 of a harder alloy firmly screwed into core 35 and having its lower end 37 turned down to the size desired for making the spotwelds. Tip 36, 37 is made of an alloy of the desired hardness and which has the greatest electrical conductivity consistent therewith. Shrunk or otherwise securely fastened to the core 35 is a shell part 38. Similarly secured to part 38 is another shell part 39, and to shell 39 another shell 40 is secured. These shells may or may not be insulated from each other and from core 35. Insulation is shown at 52.

At the contacting end of the electrode each of shells 38, 39, and 40 is provided with a series of flexible blades 41 of high conductivity material and reasonable spring temper. They are set into recesses in the ends of the shells with silver solder. These blades are formed with a slight bend or knee at 42 to guide their bending in a uniform manner. They are very thin to increase their number and the lightness of their contact with the work, and are spaced apart by about their own thickness. To further increase the flexibility and conformability to inequalities in the work surface, the free ends of the blades are slotted for a slight distance in from the end as at 43. These blades normally extend slightly beyond the tip of the forging electrode 37 and when the assembly is pressed against a work surface the blades all yield, bending uniformly until forging tip 37 contacts the work also.

As shown, core 35 is designed to carry $\tfrac{6}{12}$th, or one-half of the total current, shell 38 to carry $\tfrac{3}{12}$, shell 39 $\tfrac{2}{12}$th, and shell 40 $\tfrac{1}{12}$th, as is indicated by the leads 44, 45, 46, and 47, respectively, the shell currents being in approximate proportion to their respective relative areas of contact with the work. This desired distribution of the current is partly secured by constructing the shells of materials of different conductivities, as indicated by the cross-hatching. With only half the total current passing to the work thru core tip 37, the heating at the junction between tip 37 and the work surface is greatly reduced, the heat varying with the square of the current, other factors remaining equal. The purpose of the blades of course is to provide good electrical contact with light mechanical pressure so as to relieve tip 37 of excessive current and heating. With tip 37 maintained relatively cool, it will retain its hardness and therefore its size and shape.

Each of the shell parts 38, 39, and 40 are shown directly connected to the transformer lead 53 to best insure the desired current distribution. Grooves 49, 50, and 51, are provided for securely clamping such connections to the shell parts. Lead 54 from secondary S of transformer 48 is to be connected to the opposite electrode, not shown.

Fig. 7 shows a modification of the electrode of Fig. 5 in which provision is made to bring the forging tip close to an angle or other projection from the work surface. Fig. 8 shows further modification to provide placing the spot in a close corner.

The blades 41 of Fig. 5 are preferably of thinner material than indicated by the drawing, it being desirable to get as many firm, positive, yet light contacts with the work surface as is possible in order to get good electrical contact with light mechanical pressure.

Figs. 9 and 10 show another form of seamwelder roller in cross-section. 55 is the main body of the electrode and is of high conductivity material. 56 is a hard alloy tire for impressing the forging pressure on the work, and transmitting thereto also a goodly portion of the welding current. 57, 58, and 59 are discs fitted to shoulders on roller body 55 and may be shrunk on as in Fig. 9 or fastened with screws as in Fig. 10 where the screws 60 conduct the current thru insulation 61. In Fig. 9 the conduction is direct.

The outer edges of these discs are fitted with flexible blades 62 similar to those of Fig. 5, altho heavier, and with a knee at 63. These blades normally project slightly beyond the rim of forging tire 56 as shown at the top of Fig. 9, but when the assembly is pressed against the work the blades yield and allow tire 56 to press against the work as at the bottom of Fig. 10. All of the current comes in thru shaft and body 55 and is then distributed as before, according to the relative resistances of the respective paths, the material in the disc 59 being of the lowest resistance to compensate for the longer travel thru the work, the other paths being adjusted accordingly.

Fig. 11 shows the close arrangement of the screws 60 of Fig. 10 which are so placed in order to get reasonably even current transfer when screws are relied upon to conduct the current from body 55.

Still another modification of the seam-welder electrode is shown in Figs. 12 and 13. In this case the auxiliary current-carrying means, while fitted with flexible blades 64 as before, slides along the work surface, being in the form of a brush or shoe rather than a wheel. This is in order to get more flexible blades contacting the work surface and to have them positioned well ahead of the point of contact of forging roller 65 with the work surface, for reasons previously described. These shoes or brushes come almost together at the front as shown in Fig. 12 so as to contact as much of the work surface adjacent the weld area as is possible. The resistances of sections 66, 67, 68, and 69, are regulated as before so as to have each section carry its desired portion of the current. The blades 64 are heavier and stiffer than those of Fig. 5.

Having described the invention in detail, what I claim is—

1. An electrode for conducting welding current and forging pressure to a work piece to perform a spot welding operation comprising a central cylindrical forging member or core of strong and relatively high electrical resistance material shaped at its face to contact but a small area of the work piece surface; an outer substantially concentric current-carrying member or shell of low electrical resistance material shaped at its face to contact an adjacent and relatively large area of the work piece surface; means for pressing said core against the work piece at the necessary forging pressure, and means for independently pressing said shell face against the work piece at substantially less than the said forging pressure; the said pressures, materials, and face areas of the core and of the shell being so related as to concentrate the forging pressure and distribute the welding current thereby applied to the surface of the work piece.

2. An electrode for conducting welding current and forging pressure to a work surface to perform a spot welding operation comprising a central cylindrical forging member or core of strong and relatively high electrical resistance material shaped at its face to contact but a small area of the work surface, and means for pressing said core against the work surface under the necessary forging pressure; an outer and substantially concentric current-carrying member or shell of low electrical resistance material shaped at its face to contact an adjacent and relatively large area of the work surface and adapted to slide longitudinally on said core, and cushioned means for pressing said shell against the work surface at a substantially lower pressure than that applied to the core; whereby the relative electrical resistances of the path through the core, including its contact with the work, and the path thru the shell, including its contact with the work, may be adjusted to control the proportion of the said welding current carried by each of said paths while all of the forging pressure is applied to the work by the said core.

3. An electrode for conducting welding current and forging pressure to a work surface to perform a spot welding operation comprising a central cylindrical forging member or core of strong and relatively high electrical resistance material shaped at its face to contact but a small area of the work surface; an outer and substantially concentric current-carrying member or shell of low electrical resistance material rigidly secured to said core and shaped at its face to contact an adjacent and relatively large area of the work surface; means for pressing said core against the work at the necessary forging pressure; a brush composed of a large number of very thin conducting strips or fingers secured by one end to the face of the said shell and preferably arranged face to face in one or more rows substantially concentric with said core; said fingers being formed with a bend or knee about midway of their length to induce uniform bending under compression and having their faces spaced apart by approximately their own thickness to provide for movement of said knees when bending; said fingers having their free ends normally projecting slightly beyond the face of said core and adapted to be compressed to the same plane as the core face when the electrode is pressed against the work surface; the said pressure, materials, and areas of contact being so related as to control the proportion of the total welding current carried by the core and by the brush, respectively.

4. An electrode for spot welding machines comprising in combination a high-strength cylindrical core of an alloy having relatively high electrical resistance, means for pressing the same against the work to be welded at normal forging pressure, the contact face of said core having an area substantially that of the weld desired; an outer shell of low electrical resistance material with a contact face of substantially greater area than that of said core face, said shell face being yieldably related to said core face, and means for pressing said shell face against the work at a pressure substantially less than the said normal forging pressure; the said pressures, materials, and areas being so related as to control the proportion of the total welding current carried each by the core and by the shell.

5. An electrode for conducting welding current and forging pressure to a work surface to perform a spot welding operation characterized by being constructed of two main parts, a central cylindrical core of relatively high electrical resistance material faced to effect a small area of contact with the work surface, and a concentric outer shell of low electrical resistance material faced to effect a substantially larger area of contact with the work surface; associated means for pressing the core against the work surface with the necessary forging pressure, and means for pressing the shell against the work surface with substantially less pressure than applied to the core; whereby the electrical resistances of the path thru the core, including its contact with the work, and the path thru the shell, including its contact with the work, may be adjusted to control the proportion of the said welding current carried by each of said paths, while all of the forging pressure is applied to the work by the core.

6. In an electrode for spot welding machines the combination of a high-strength core of relatively high electrical resistance material, means associated therewith to press the face of said core against a work surface to give the necessary forging pressure, a low-resistance outer shell substantially concentric with said core and having a yielding or flexible face, and means for pressing said flexible face against the work surface at substantially less pressure than that exerted by the core.

7. In an electrode for spot welding machines the combination of a high-strength core of relatively high electrical resistance material, means associated therewith to press the face of said core against a work surface to give the necessary forging pressure, a low-resistance outer shell divided longitudinally into several concentric layers each of which is composed of such material and of such cross-section relative to each of the other layers as to insure substantially the same current density in each of the said layers, and means for pressing the face of said outer shell against the work surface at substantially less pressure than that exerted by the core.

8. In an electrode for spot welding machines the combination of a high-strength core of relatively high electrical resistance material, means associated therewith to press the face of said core against a work surface to give the necessary forging pressure, a low-resistance outer shell substantially concentric with said core and having a yielding or flexible face, said outer shell being divided longitudinally into several concentric layers each of which is composed of such material and of such cross-sectional area relative to each of the other layers as to insure substantially the same current density in each of said layers, and means for pressing the face of said outer shell against the work surface at substantially less pressure than that exerted by the core.

JESSE J. BROWN.